United States Patent
Ryu

(10) Patent No.: US 9,755,730 B2
(45) Date of Patent: Sep. 5, 2017

(54) SATELLITE COMMUNICATION SYSTEM AND METHOD OF CANCELLING INTERFERENCE IN THE SATELLITE COMMUNICATION SYSTEM

(71) Applicant: Electronics and Telecommunications Research Institute, Daejeon (KR)

(72) Inventor: Joon Gyu Ryu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/006,527

(22) Filed: Jan. 26, 2016

(65) Prior Publication Data

US 2016/0218796 A1 Jul. 28, 2016

(30) Foreign Application Priority Data

Jan. 26, 2015 (KR) .................. 10-2015-0012210

(51) Int. Cl.
*H04B 1/00* (2006.01)
*H04B 7/185* (2006.01)

(52) U.S. Cl.
CPC ..... *H04B 7/18513* (2013.01); *H04B 7/18517* (2013.01)

(58) Field of Classification Search
CPC .................. H04B 7/18513; H04B 7/18517
USPC ...................................................... 455/63.1
See application file for complete search history.

(56) References Cited

U.S. PATENT DOCUMENTS

| 6,532,272 B1* | 3/2003 | Ryan ............... G11B 20/10009 360/65 |
| 6,907,093 B2* | 6/2005 | Blount .................. H04B 1/525 375/211 |
| 7,522,877 B1* | 4/2009 | Avellan .............. H04B 7/18517 455/12.1 |
| 7,729,657 B1* | 6/2010 | Avellan .............. H04B 7/18582 370/310 |
| 8,238,817 B1* | 8/2012 | Avellan .............. H04B 7/18543 455/12.1 |
| 2002/0166124 A1* | 11/2002 | Gurantz ............. H04L 12/2801 725/78 |
| 2003/0224723 A1* | 12/2003 | Sun .................... H04B 7/18528 455/12.1 |
| 2010/0183106 A1* | 7/2010 | Beidas ............. H04L 25/03038 375/350 |

(Continued)

FOREIGN PATENT DOCUMENTS

KR 1020100131006 A 12/2010
KR 101160094 B1 6/2012

(Continued)

*Primary Examiner* — April G Gonzales
(74) *Attorney, Agent, or Firm* — William Park & Associates Ltd.

(57) ABSTRACT

A satellite communication system and a method of cancelling interference in the satellite communication system are disclosed. The method of cancelling interference in the satellite communication system may include receiving a signal by a central station from a terminal via a satellite transponder, estimating, from the signal, a nonlinear characteristic associated with a central station signal transmitted from the central station, and cancelling an interference signal from the signal using the estimated nonlinear characteristic.

17 Claims, 5 Drawing Sheets

(56) References Cited

U.S. PATENT DOCUMENTS

| | | | | |
|---|---|---|---|---|
| 2010/0316161 A1* | 12/2010 | Kim | ...................... | H04L 1/0057 |
| | | | | 375/295 |
| 2011/0299572 A1* | 12/2011 | Monsen | ............. | H04B 7/18513 |
| | | | | 375/214 |
| 2012/0258679 A1* | 10/2012 | Chang | .................. | H04B 1/1036 |
| | | | | 455/233.1 |
| 2014/0079160 A1* | 3/2014 | Beidas | .................. | H04L 25/067 |
| | | | | 375/341 |
| 2014/0126675 A1* | 5/2014 | Monsen | ............ | H04L 25/03012 |
| | | | | 375/350 |

FOREIGN PATENT DOCUMENTS

| | | | |
|---|---|---|---|
| WO | 2006073893 | A2 | 7/2006 |
| WO | 2009124195 | A1 | 10/2009 |

* cited by examiner

SATELLITE COMMUNICATION SYSTEM AND METHOD OF CANCELLING INTERFERENCE IN THE SATELLITE COMMUNICATION SYSTEM

CROSS-REFERENCE TO RELATED APPLICATION

This application claims the priority benefit of Korean Patent Application No. 10-2015-0012210 filed on Jan. 26, 2015, in the Korean Intellectual Property Office, the disclosure of which is incorporated herein by reference.

BACKGROUND

1. Field of the Invention

Embodiments relate to a satellite communication system and a method of cancelling interference in the satellite communication system to improve frequency efficiency by receiving and transmitting a signal using a same satellite channel in the satellite communication system using a satellite transponder.

2. Description of the Related Art

Due to a recent continuing increase in demand for broadband Internet services and emergency communication networks using Internet protocol (IP)-based satellite communication networks, countries including the United Kingdom and Japan are promoting related policies for wide distribution of satellite-based broadband communication services to reduce an information gap and construct infrastructures for ultra high-speed Internet. However, due to a relatively high rental cost for a satellite communication frequency, expansion of a satellite-based communication service may be limited. Thus, there is a desire for technology for effectively using a satellite communication frequency resource.

In related arts, a satellite communication system may measure, in advance, and store a characteristic of a travelling wave tube amplifier (TWTA), for example, an amplitude modulation (AM)/AM or an AM/phase modulation (PM), restore a signal to be received from a satellite transponder through a demodulation process, apply the TWTA characteristic to the restored signal, and extract a desired signal, for example, a terminal signal, by eliminating, from the received signal, interference, for example, a central station signal returning to a central station by a satellite.

In the related arts, however, only a TWTA characteristic of a central station may be compensated for, and only a TWTA characteristic in an initial installation may be stored and compensated for. Thus, a change in the characteristic occurring due to performance deterioration in a long-term operation may not be compensated for.

Thus, there is a desire for technology for estimating a nonlinear characteristic of a high power amplifier (HPA) at a central station and a satellite, for example, a satellite transponder, in an initial installation, and eliminating interference from a received signal, and thereby compensating for a change in such a characteristic in a long-term operation and eliminating interference in a satellite communication system using a same satellite channel.

SUMMARY

Embodiments provide a system and a method to enable reception and transmission of a signal between a central station and a terminal through a same satellite channel, for example, a frequency band, and improve frequency efficiency by cancelling interference occurring due to a signal to be re-input to the central station by a satellite transponder receiving a central station signal using a nonlinear characteristic associated with the central station signal and thereby obtaining a terminal signal.

In addition, the system and the method may estimate a high power amplifier (HPA) nonlinear characteristic by the central station or an interaction between the central station and the satellite transponder, and specify and cancel, using the estimated HPA nonlinear characteristic, an interference signal similar to the re-input signal from an overlapping signal received by the satellite transponder through the same satellite channel.

According to an aspect, there is provided a method of cancelling interference in a satellite communication system, the method including receiving, by a central station, a signal from a terminal via a satellite transponder, estimating, from the received signal, a nonlinear characteristic associated with a central station signal transmitted from the central station, and cancelling an interference signal from the signal using the estimated nonlinear characteristic.

According to another aspect, there is provided a method of cancelling interference in a satellite communication system, the method including receiving an overlapping signal to be transmitted to a central station of the satellite communication system via a satellite transponder through a first frequency band, estimating, from the overlapping signal, a nonlinear characteristic associated with a central station signal, generating an interference signal for the overlapping signal using the estimated nonlinear characteristic, and cancelling the generated interference signal from the overlapping signal.

According to still another aspect, there is provided a satellite communication system including a receiver configured to receive a signal by a central station from a terminal via a satellite transponder, an estimator configured to estimate, from the received signal, a nonlinear characteristic associated with a central station signal transmitted from the central station, and a canceller configured to cancel an interference signal from the signal using the estimated nonlinear characteristic.

BRIEF DESCRIPTION OF THE DRAWINGS

These and/or other aspects, features, and advantages of the disclosure will become apparent and more readily appreciated from the following description of embodiments, taken in conjunction with the accompanying drawings of which.

DETAILED DESCRIPTION

Figure 1:
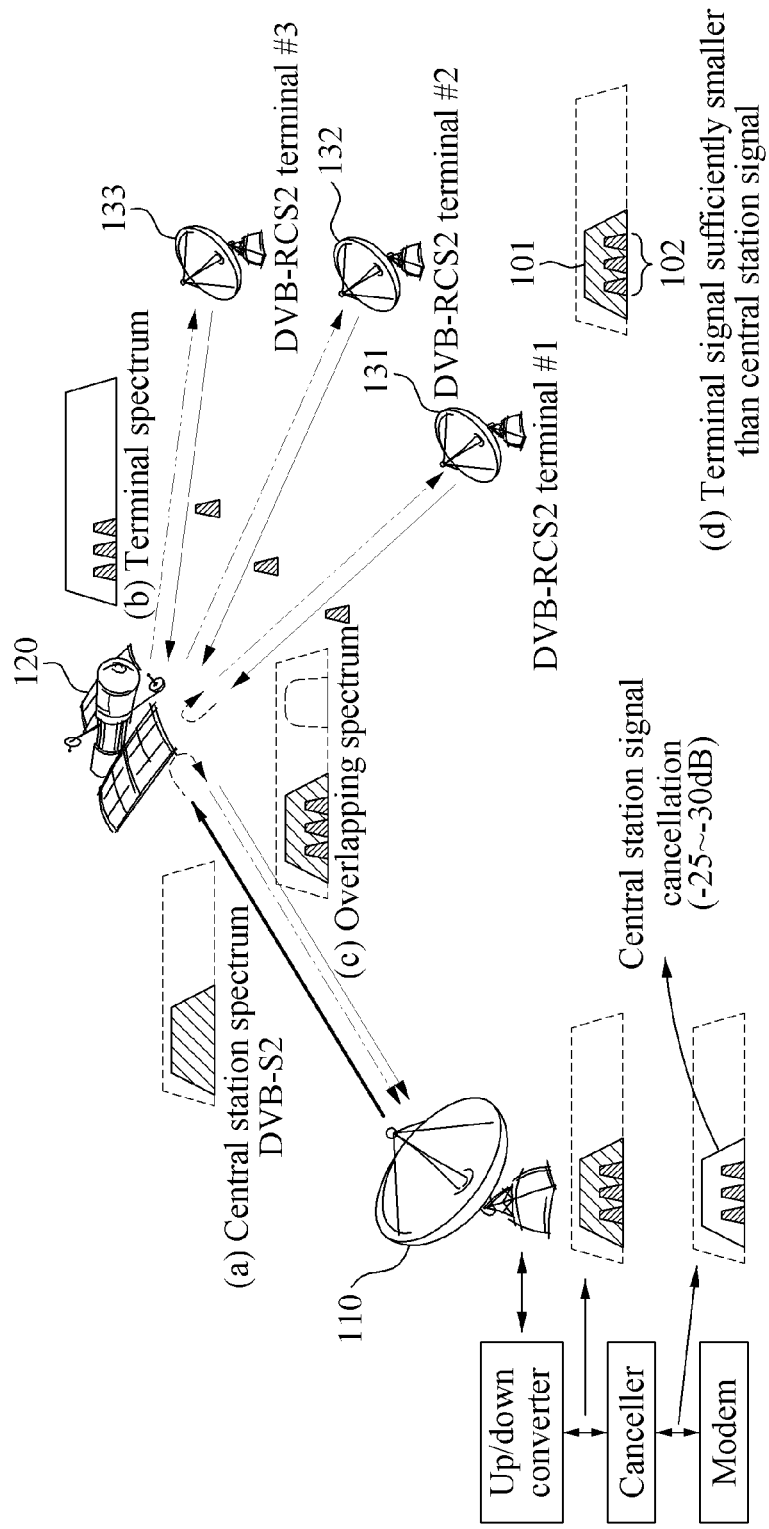
FIG. 1 is a diagram illustrating a concept of interference cancellation in a satellite communication system according to an embodiment.

Hereinafter, an application program updating device and method according to example embodiments will be described in detail with reference to the accompanying drawings. It should be understood that there is no intent to limit this disclosure to the particular example embodiments disclosed. Regarding the reference numerals assigned to the elements in the drawings, it should be noted that the same elements will be designated by the same reference numerals, wherever possible, even though they are shown in different drawings.

FIG. 1 is a diagram illustrating a concept of interference cancellation in a satellite communication system according to an embodiment.

Referring to FIG. 1, the satellite communication system is included in a central station 110, or included between the central station 110 and a satellite transponder 120. Hereinafter, an example of the satellite communication system included in the central station 110 will be described.

The central station 110 may transmit a central station signal using a large antenna and a high power amplifier (HPA), and the satellite transponder 120 receiving the central station signal from the central station 110 may transmit the central station signal to at least one terminal, for example, a terminal 131, a terminal 132, and a terminal 133.

The terminals 131, 132, and 133 may transmit a terminal signal to the central station 110 via the satellite transponder 120.

In a related satellite communication system, the central station 110 and the terminals 131, 132, and 133 may transmit and receive a signal using different frequency bands, as illustrated by (a) and (b) in FIG. 1. In the satellite communication system described herein, the central station 110 and the terminals 131, 132, and 133 may use a same frequency band to improve frequency efficiency, as illustrated by (c) and (d) in FIG. 1 in which a central station frequency 101 and a terminal frequency 102 overlap each other to be used.

In such a case, the terminals 131, 132, and 133 may receive the central station signal without an error because the terminal signal is sufficiently smaller than the central station signal by 13 decibels (dB) or greater.

Also, a portion or an entirety of the central station signal transmitted from the central station 110 may be re-input to the central station 110 by the satellite transponder 120 through a frequency band same as a frequency band of the terminal signal. The satellite communication system may obtain the terminal signal from an overlapping signal received by the central station 110, for example, the re-input signal and the terminal signal, and specifying the re-input signal as an interference signal and cancelling the interference signal using an HPA nonlinear characteristic by the central station 110 or an interaction between the central station 110 and the satellite transponder 120.

Thus, the satellite communication system may improve frequency efficiency by enabling reception and transmission of a signal between the central station 110 and the terminals 131, 132, and 133 through a same satellite channel, for example, a frequency band.

Figure 2:
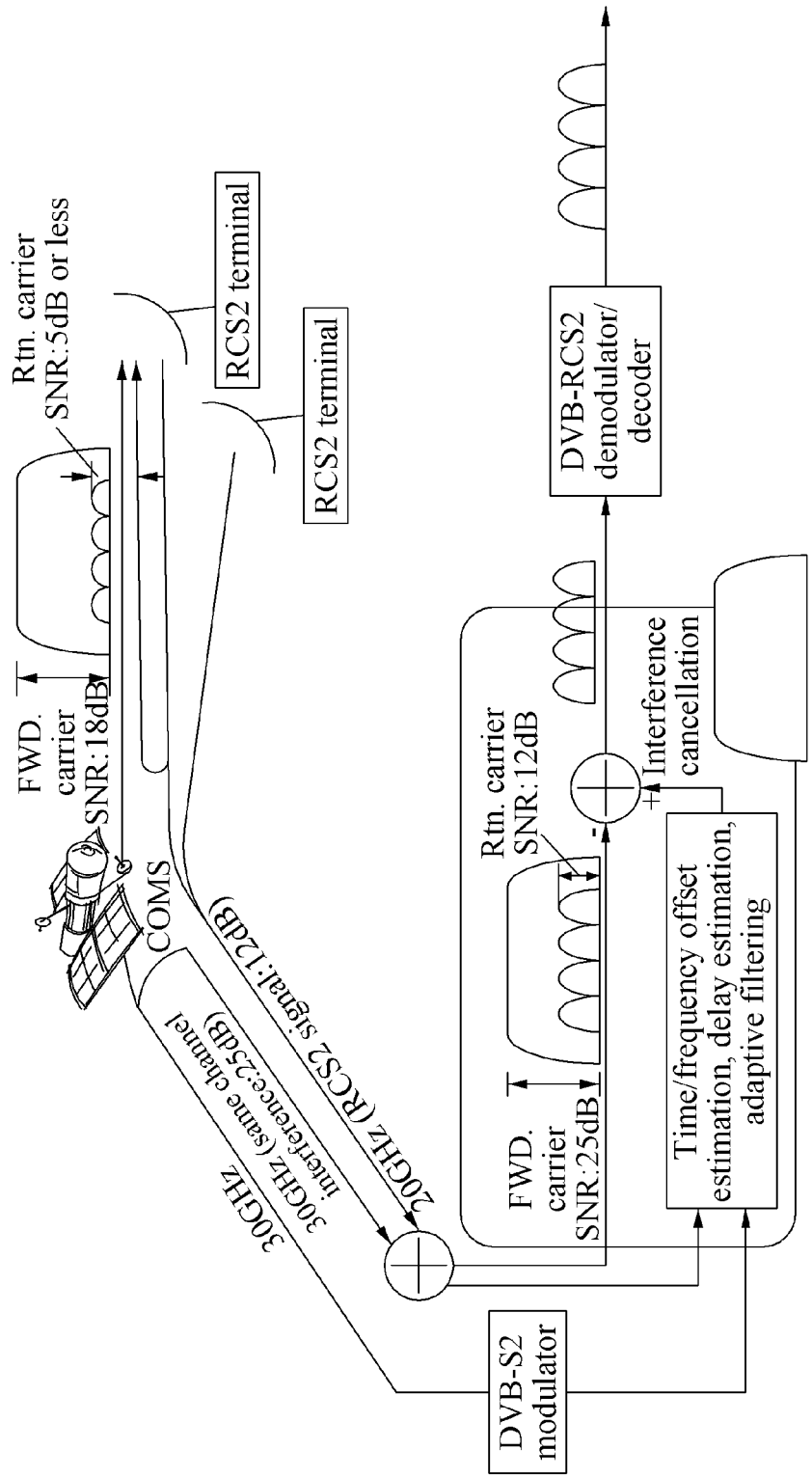
FIG. 2 is a diagram illustrating a service flow of a satellite communication system supporting satellite communication between a central station and a terminal according to an embodiment.

FIG. 2 is a diagram illustrating a service flow of a satellite communication system supporting satellite communication between a central station and a terminal according to an embodiment.

In FIG. 2, the satellite communication system is included in the central station.

Referring to FIG. 2, a satellite transponder, for example, a communication, ocean, and meteorological satellite (COMS), may transmit, to the central station through a same satellite channel, a central station signal, for example, a digital video broadcasting via satellite-second generation (DVB-S2) signal, transmitted from the central station through the same satellite channel and a terminal signal transmitted from a return channel via satellite-second generation (RCS2) terminal through the same satellite channel.

The satellite communication system may estimate an HPA nonlinear characteristic by the central station or an interaction between the central station and the satellite transponder in order to specify, as an interference signal, a re-input signal to be re-input by the satellite transponder receiving the central station signal and cancel the interference signal from a signal to be received from the satellite transponder.

For example, the satellite communication system may add the estimated nonlinear characteristic to an intermediate frequency (IF) band signal using an IF band in the central station signal and further add, to the IF band signal to which the HPA nonlinear characteristic is added, signal information associated with a timing error, a frequency error, and a phase error generated through demodulation of the received signal, in order to specify the interference signal similar to the re-input signal in the received signal, cancel the interference signal by an adaptive filter, and obtain the terminal signal, for example, a DVB-RCS2 signal.

Figure 3:
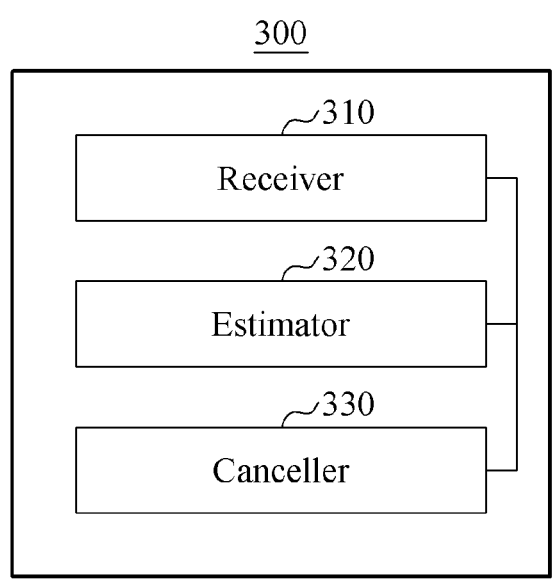
FIG. 3 is a diagram illustrating a configuration of a satellite communication system according to an embodiment.

FIG. 3 is a diagram illustrating a configuration of a satellite communication system 300 according to an embodiment.

Referring to FIG. 3, the satellite communication system 300 includes a receiver 310, an estimator 320, and a canceller 330.

The satellite communication system 300 may be included in a central station or included between the central station and a satellite transponder. Hereinafter, an example of the satellite communication system 300 included in the central station will be described.

The receiver 310 may receive a signal by the central station from a terminal via the satellite transponder.

Here, in addition to a terminal signal transmitted from the terminal, the receiver 310 may receive, from the satellite transponder, a re-input signal to be re-input to the central station by the satellite transponder in a central station signal transmitted from the central station and a signal overlapping noise, for example, a received signal or an overlapping signal.

Here, a frequency band of the signal, for example, a first frequency band, may include a frequency band, for example, a second frequency band, allocated to the re-input signal to be re-input to the central station by the satellite transponder receiving the central station signal and a frequency band, for example, a third frequency band, allocated to the terminal signal transmitted from the terminal to the central station. For example, referring back to FIG. 1, the satellite communication system 300 may enable transmission and reception of a signal via the satellite transponder 120 using a same frequency band by the central station 110 and the terminals 131, 132, and 133.

In addition, the third frequency band allocated to the terminal signal may be allocated to overlap at least a portion of the second frequency band allocated to the re-input signal. That is, the terminal signal may be maintained to be smaller than the central station signal by a preset amplitude.

For example, as illustrated in FIG. 1, the satellite communication system 300 may allow the terminals 131, 132, and 133 to receive the central station signal without interference by maintaining the terminal signal transmitted from the terminals 131, 132, and 133 to be smaller than the central station signal transmitted from the central station 110 by the preset amplitude, for example, 13 dB or greater.

The estimator 320 may estimate, from the signal, for example, the received signal or the overlapping signal, a nonlinear characteristic associated with the central station signal transmitted from the central station.

For example, the estimator 320 may estimate an HPA nonlinear characteristic by the central station or estimate an HPA nonlinear characteristic by an interaction between the central station and the satellite transponder.

In addition, the estimator 320 may estimate the nonlinear characteristic in consideration of the re-input signal in the signal to be re-input to the central station by the satellite transponder receiving the central station signal.

Figure 4:
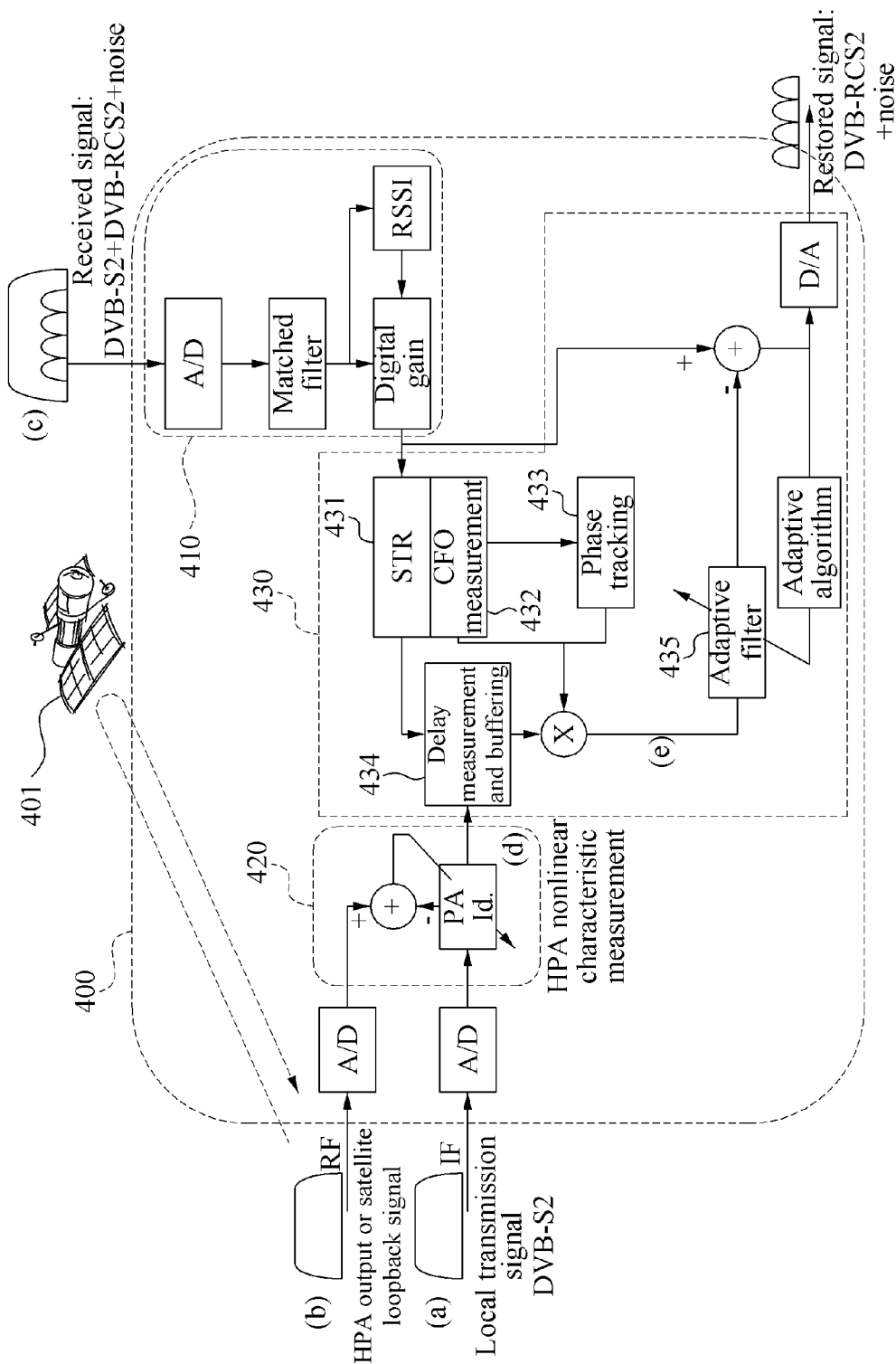
FIG. 4 is a diagram illustrating a detailed configuration of a satellite communication system according to an embodiment.

For example, referring to FIG. 4, the estimator 320, for example, an estimator 420 of FIG. 4, may estimate the HPA nonlinear characteristic by the central station or the interaction between the central station and satellite transponder, for example, a satellite transponder 401 of FIG. 4, based on an IF band signal using an IF band in the central station signal transmitted from the central station as illustrated by (a) in FIG. 4 and on the re-input signal transmitted from the central station and to be re-input to the central station by the satellite transponder 401 as illustrated by (b) in FIG. 4. Here, the estimator 320, for example, the estimator 420, may add the estimated nonlinear characteristic to the IF band signal using the IF band in the central station signal as illustrated by (d) in FIG. 4.

The canceller 330 may cancel an interference signal from the signal, for example, the received signal or the overlapping signal, using the estimated nonlinear characteristic. The canceller 330 may specify, as the interference signal to be cancelled from the signal, the re-input signal to be re-input to the central station by the satellite transponder receiving the central station signal.

For example, the canceller 330 may specify the interference signal to be cancelled by demodulating the signal by performing at least one of symbol timing recovery (STR), carrier frequency offset (CFO) measurement, and phase tracking, and further adding signal information associated with at least one of a timing error, a frequency error, and a phase error generated through the demodulating of the signal to the IF band signal to which the estimated nonlinear characteristic is added.

For example, referring to FIG. 4 again, the canceller 330, for example, a canceller 430 of FIG. 4, may generate the interference signal similar to the re-input signal by further adding signal information associated with at least one of a timing error generated through STR 431, a frequency error generated through CFO measurement 432, and a phase error generated through phase tracking 433 to the IF band signal to which the HPA nonlinear characteristic is added. Thus, the canceller 330, for example, the canceller 430, may specify the interference signal from the signal, for example, the received signal or the overlapping signal.

The canceller 330 may cancel, as the interference signal, the re-input signal included in the signal by an adaptive filter having the nonlinear characteristic. The canceller 330 may obtain the terminal signal, for example, a DVB-RCS2 signal, transmitted from the terminal to the central station.

As described above, according to an embodiment, frequency efficiency may be improved by obtaining a terminal signal by cancelling interference occurring due to a re-input signal to be re-input to a central station by a satellite transponder receiving a central station signal, using a nonlinear characteristic for the central station signal, and by enabling reception and transmission of a signal between the central station and a terminal through a same satellite channel, for example, a same frequency band.

In addition, according to an embodiment, an HPA nonlinear characteristic by the central station or an interaction between the central station and the satellite transponder may be estimated, and an interference signal similar to the re-input signal may be specified and cancelled from an overlapping signal to be received from the satellite transponder through the same satellite channel using the estimated HPA nonlinear characteristic.

According to another embodiment, the satellite communication system 300 may receive, through a first frequency band, an overlapping signal, for example, a received signal, transmitted to a central station of the satellite communication system 300 via a satellite transponder, estimate a nonlinear characteristic associated with a central station signal in the overlapping signal, generate an interference signal for the overlapping signal, and cancel the generated interference signal from the overlapping signal.

Here, when the central station signal is transmitted from the central station to at least one terminal via the satellite transponder through a second frequency band included in the first frequency band, the satellite communication system 300 may estimate the nonlinear characteristic using an IF band signal using an IF band and a re-input signal to be re-input to the central station by the satellite transponder receiving the central station signal.

In addition, the satellite communication system 300 may generate, as the interference signal, a signal similar to the re-input signal by demodulating the overlapping signal by performing at least one of STR, CFO measurement, and phase tracking on the received overlapping signal, and adding the estimated nonlinear characteristic to the IF band signal and further adding signal information associated with at least one of a timing error, a frequency error, and a phase error generated through the demodulating of the overlapping signal to the IF band signal.

Further, the satellite communication system 300 may obtain a terminal signal by cancelling the generated interference signal from the overlapping signal using an adaptive filter.

FIG. 4 is a diagram illustrating a detailed configuration of a satellite communication system 400 according to an embodiment.

Referring to FIG. 4, the satellite communication system 400 includes a receiver 410, an estimator 420, and a canceller 430. Here, the satellite communication system 400 may be included in a central station.

The receiver 410 may receive, from a satellite transponder 401, a re-input signal of a central station signal transmitted from the central station, for example, a DVB-S2 signal, which is to be re-input to the central station by the satellite transponder 401, for example, a satellite loopback signal, a terminal signal transmitted from at least one terminal, for example, a DVB-RCS2 signal, and a signal including noise, for example, a received signal or an overlapping signal.

For example, the receiver 410 may include an analog-to-digital (A/D) converter, a matched filter, a received signal strength indication (RSSI), and a digital gain.

The receiver 410 may convert the received signal to a digital signal through the A/D converter, and filter out noise from the digital signal through the matched filter, and generate the digital gain for the signal from which the noise is filtered out using the RSSI.

The estimator 420 may estimate, from the received signal, a nonlinear characteristic associated with the central station signal transmitted from the central station.

In detail, the estimator 420 may estimate an HPA nonlinear characteristic by the central station or an interaction between the central station and satellite transponder 401 based on an IF band signal using an IF band in the central station signal transmitted from the central station as illustrated by (a) in FIG. 4 and on the re-input signal transmitted from the central station and to be re-input to the central station by the satellite transponder 401 as illustrated by (b) in FIG. 4.

Here, the estimator 420 may add the estimated HPA nonlinear characteristic to the IF band signal as illustrated by (d) in FIG. 4.

The canceller 430 may restore the terminal signal transmitted from the terminal by canceling an interference signal, for example, the re-input signal, from the received signal using the estimated HPA nonlinear characteristic as illustrated by (e) in FIG. 4. Here, the restored terminal signal, for example, a restored signal, may include the DVB-RCS2 signal and noise.

For example, the canceller 430 may include STR 431, CFP measurement 432, phase tracking 433, delay measurement and buffering 434, an adaptive filter 435, and a digital-to-analog (D/A) converter.

In detail, the canceller 430 may demodulate the received signal by performing at least one of the STR 431, the CFO measurement 432, and the phase tracking 433. The canceller 430 may generate a timing error with respect to the received signal through the STR 431, a frequency error with respect to the received signal through the CFO measurement 432, and a phase error with respect to the received signal through the phase tracking 433.

The canceller 430 may generate the interference signal similar to the re-input signal by further adding, to the IF band signal to which the HPA nonlinear characteristic is added, signal information associated with at least one of the generated timing error, the generated frequency error, and the generated phase error.

The canceller 430 may obtain the terminal signal, for example, the DVB-RCS2 signal, by cancelling the interference signal from the received signal through the adaptive filter 435.

As described above, the satellite communication system 400 using a same satellite channel between the central station and the satellite transponder 401 may more conveniently specify the re-input signal included in the received signal as the interference signal and cancel the interference signal using the HPA nonlinear characteristic by the central station and the satellite transponder 401 in an initial installation, and thus may more easily compensate for a change in the characteristic even in a long-term operation compared to a related satellite communication system configured to cancel interference using a travelling wave tube amplifier (TWTA) characteristic.

Hereinafter, a flow of operations of the satellite communication system 300 of FIG. 3 will be described with reference to FIG. 5.

Figure 5:
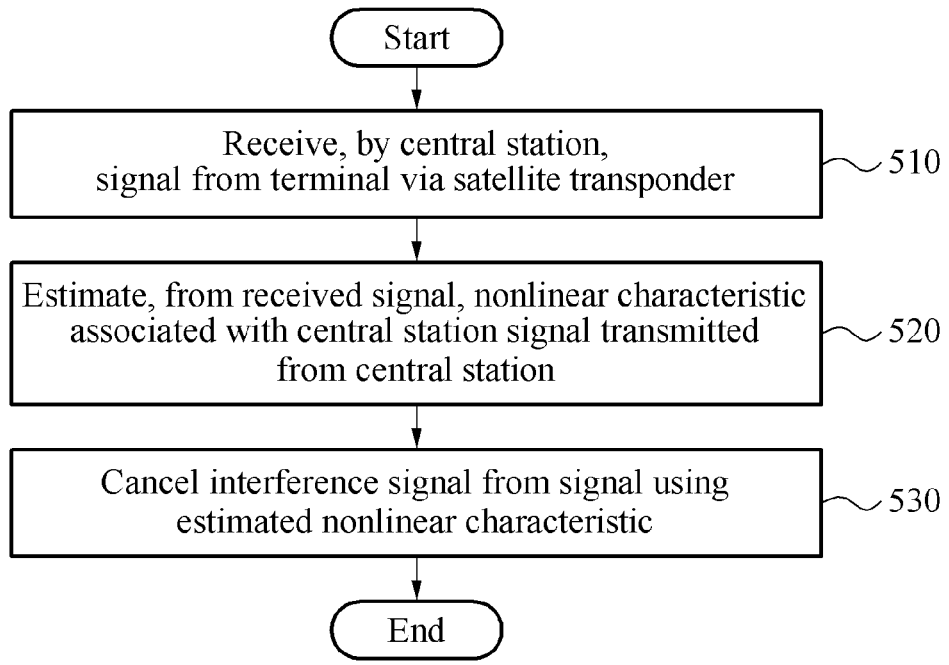
FIG. 5 is a flowchart illustrating a method of cancelling interference in a satellite communication system according to an embodiment.

FIG. 5 is a flowchart illustrating a method of cancelling interference in a satellite communication system according to an embodiment.

The method of cancelling interference to be described hereinafter may be performed by the satellite communication system 300 of FIG. 3.

Referring to FIG. 5, in operation 510, the satellite communication system 300 receives a signal by a central station from a terminal via a satellite transponder.

Here, in addition to a terminal signal transmitted from the terminal, the satellite communication system 300 may receive, from the satellite transponder, a re-input signal of a central station signal transmitted from the central station, which is to be re-input to the central station again by the satellite transponder, and a signal overlapping noise, for example, a received signal or an overlapping signal.

In operation 520, the satellite communication system 300 estimates, from the signal, a nonlinear characteristic associated with the central station signal transmitted from the central station.

For example, the satellite communication system 300 may estimate an HPA nonlinear characteristic by the central station or an interaction between the central station and the satellite transponder, based on an IF band signal using an IF band in the central station signal transmitted from the central station and on the re-input signal to be re-input to the central station again by the satellite transponder receiving the central station signal from the central station.

In operation 530, the satellite communication system 300 cancels an interference signal from the signal using the estimated nonlinear characteristic.

In detail, the satellite communication system 300 may specify the interference signal from the signal, for example, the received signal or the overlapping signal, by adding the estimated nonlinear characteristic to the IF band signal using the IF band in the central station signal and further adding, to the IF band signal to which the HPA nonlinear characteristic is added, signal information, for example, a timing error, a frequency error, and a phase error, generated through demodulation of the signal by performing at least one of STR, CFO measurement, and phase tracking, and generating the interference signal similar to the re-input signal.

The satellite communication system 300 may cancel the re-input signal included in the signal as the interference signal by an adaptive filter, and obtain the terminal signal, for example, a DVB-RCS2 signal, transmitted from the terminal to the central station.

As described above, reception and transmission of a signal between a central station and a terminal through a same satellite channel, for example, a same frequency band, may be enabled and frequency efficiency may be improved by cancelling interference occurring due to a re-input signal to be re-input to the central station by a satellite transponder receiving a central station signal by using a nonlinear characteristic for the central station signal and thereby obtaining a terminal signal.

According to example embodiments described herein, a system and method may enable reception and transmission of a signal between a central station and a terminal through a same satellite channel, for example, a frequency band, and improve frequency efficiency by cancelling interference occurring due to a signal to be re-input to the central station by a satellite transponder receiving a central station signal using a nonlinear characteristic associated with the central station signal and thereby obtaining a terminal signal.

In addition, the system and method may estimate an HPA nonlinear characteristic by the central station or an interaction between the central station and the satellite transponder, and specify and cancel, using the estimated HPA nonlinear characteristic, an interference signal similar to the re-input signal from an overlapping signal received by the satellite transponder through the same satellite channel.

The above-described example embodiments of the present disclosure may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tapes; optical media such as CD ROMs and DVDs;

magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of cancelling interference in a satellite communication system, the method comprising:
    receiving, by a central station, a signal from a terminal via a satellite transponder; estimating, from the received signal, a nonlinear characteristic associated with a central station signal transmitted from the central station; and
    cancelling an interference signal from the signal using the estimated nonlinear characteristic,
    wherein a frequency band of the signal comprises a frequency band allocated to a re-input signal to be re-input to the central station through the satellite transponder receiving the central station signal, and a frequency band allocated to a terminal signal to be transmitted to the central station from the terminal.

2. The method of claim 1, wherein the estimating of the nonlinear characteristic comprises:
    estimating a high power amplifier (HPA) nonlinear characteristic by the central station; or
    estimating an HPA nonlinear characteristic by an interaction between the central station and the satellite transponder.

3. The method of claim 1, wherein the estimating of the nonlinear characteristic comprises: estimating, from the signal, the nonlinear characteristic in consideration of the re-input signal to be re-input to the central station by the satellite transponder receiving the central station signal.

4. The method of claim 1, wherein the cancelling of the interference signal comprises:
    demodulating the signal by performing at least one of symbol timing recovery (STR), carrier frequency offset (CFO) measurement, and phase tracking; and
    specifying the interference signal to be cancelled by adding, to an intermediate frequency (IF) band signal using an IF band in the central station signal, the estimated nonlinear characteristic and signal information associated with at least one of a timing error, a frequency error, and a phase error generated through the demodulating of the signal.

5. The method of claim 1, wherein the cancelling of the interference signal comprises: specifying, as the interference signal to be cancelled, the re-input signal in the signal to be re-input to the central station by the satellite transponder receiving the central station signal.

6. The method of claim 5, wherein the cancelling of the interference signal further comprises: cancelling the re-input signal comprised in the signal by an adaptive filter having the nonlinear characteristic.

7. The method of claim 1, further comprising: obtaining a terminal signal to be transmitted to the central station from the terminal by cancelling the interference signal from the signal.

8. The method of claim 1, wherein the frequency band allocated to the terminal signal is allocated to overlap at least a portion of the frequency band allocated to the re-input signal.

9. The method of claim 1, wherein the terminal signal is maintained to be smaller than the central station signal by a preset amplitude.

10. A method of cancelling interference in a satellite communication system, the method comprising:
    receiving an overlapping signal to be transmitted to a central station of the satellite communication system via a satellite transponder through a first frequency band;
    estimating, from the overlapping signal, a nonlinear characteristic associated with a central station signal;
    generating an interference signal for the overlapping signal using the estimated nonlinear characteristic; and
    cancelling the generated interference signal from the overlapping signal,
    wherein, when the central station signal is transmitted to at least one terminal from the central station via the satellite transponder through a second frequency band comprised in the first frequency band, the estimating of the nonlinear characteristic comprises: estimating the nonlinear characteristic using an intermediate frequency (IF) band signal using an IF band in the central station signal and a re-input signal to be re-input to the central station by the satellite transponder receiving the central station signal.

11. The method of claim 10, further comprising:
    demodulating the overlapping signal by performing at least one of symbol timing recovery (STR), carrier frequency offset (CFO) measurement, and phase tracking on the received overlapping signal, and wherein the generating of the interference signal comprises: adding the estimated nonlinear characteristic to the IF band signal; and
    generating, as the interference signal, a signal similar to the re-input signal by further adding, to the IF band signal, signal information associated with at least one of a timing error, a frequency error, and a phase error generated through the demodulating of the overlapping signal.

12. The method of claim 10, wherein the cancelling of the generated interference signal comprises: obtaining a terminal signal by cancelling the generated interference signal from the overlapping signal using an adaptive filter.

13. A satellite communication system, comprising:
    a receiver configured to receive a signal by a central station from a terminal via a satellite transponder;

an estimator configured to estimate, from the received signal, a nonlinear characteristic associated with a central station signal transmitted from the central station; and a canceller configured to cancel an interference signal from the signal using the estimated nonlinear characteristic, wherein the estimator is configured to add the estimated nonlinear characteristic to an intermediate frequency (IF) band signal using an IF band in the central station signal, and the canceller is configured to demodulate the signal by performing at least one of symbol timing recovery (STR), carrier frequency offset (CFO) measurement, and phase tracking, and specify the interference signal to be cancelled by further adding, to the IF band signal, signal information associated with at least one of a timing error, a frequency error, and a phase error generated through the demodulating of the signal.

14. The system of claim 13, wherein the estimator is configured to estimate a high power amplifier (HPA) nonlinear characteristic by the central station or an HPA nonlinear characteristic by an interaction between the central station and the satellite transponder.

15. The system of claim 13, wherein the estimator is configured to estimate, from the signal, the nonlinear characteristic in consideration of a re-input signal to be re-input to the central station by the satellite transponder receiving the central station signal.

16. The system of claim 13, wherein the canceller is configured to cancel a re-input signal in the signal by an adaptive filter having the nonlinear characteristic.

17. The system of claim 13, wherein the canceller is configured to obtain a terminal signal transmitted from the terminal to the central station by cancelling the interference signal from the signal.

* * * * *